United States Patent [19]
Vela-Cuellar

[11] Patent Number: 6,109,855
[45] Date of Patent: Aug. 29, 2000

[54] GAME HOIST AND CARRIER APPARATUS

[76] Inventor: Carlos E Vela-Cuellar, 10613 Watchful Fox Dr., Austin, Tex. 78748

[21] Appl. No.: 09/326,319

[22] Filed: Jun. 7, 1999

[51] Int. Cl.[7] .................................................... B60P 9/00
[52] U.S. Cl. ........................ 414/462; 212/180; 224/521; 452/189
[58] Field of Search ........................... 414/462; 212/180; 452/187, 189; 119/728; 224/519, 521

[56] References Cited

U.S. PATENT DOCUMENTS

| | | | |
|---|---|---|---|
| 3,044,643 | 7/1962 | Shaw | 414/462 |
| 3,854,168 | 12/1974 | Bradley | 452/189 |
| 4,338,703 | 7/1982 | Tanner | 452/187 |
| 4,806,063 | 2/1989 | York | 212/180 |
| 4,903,372 | 2/1990 | Jones | 452/189 |
| 5,328,192 | 7/1994 | Thompson . | |
| 5,393,194 | 2/1995 | Smith . | |
| 5,492,196 | 2/1996 | Michno . | |
| 5,662,451 | 9/1997 | Muzzi et al. . | |
| 5,791,858 | 8/1998 | Sasser | 414/462 |

*Primary Examiner*—Thomas J. Brahan
*Attorney, Agent, or Firm*—Michael I Kroll

[57] ABSTRACT

A hoist and carrier apparatus for securing game to a vehicle. The hoist and carrier apparatus includes a device for connecting the apparatus to the vehicle and a vertical member having a first end connected to the connecting device, a second end and a pulley wheel disposed on the second end of the vertical member. A game hoist carrier receives the game and is releasably connected to and slideable along a length of the vertical member. A pulley is connected to and extends from the first vertical member and a cable extends from the pulley and over the pulley wheel for connecting to the game hoist carrier. When the cable is caused to be wound on the pulley, the game hoist carrier is caused to be pulled towards the vertical member and, upon being secured to the vertically extending member, slide upward along the length of the vertically extending member thereby raising any game releasably secured thereto.

3 Claims, 6 Drawing Sheets

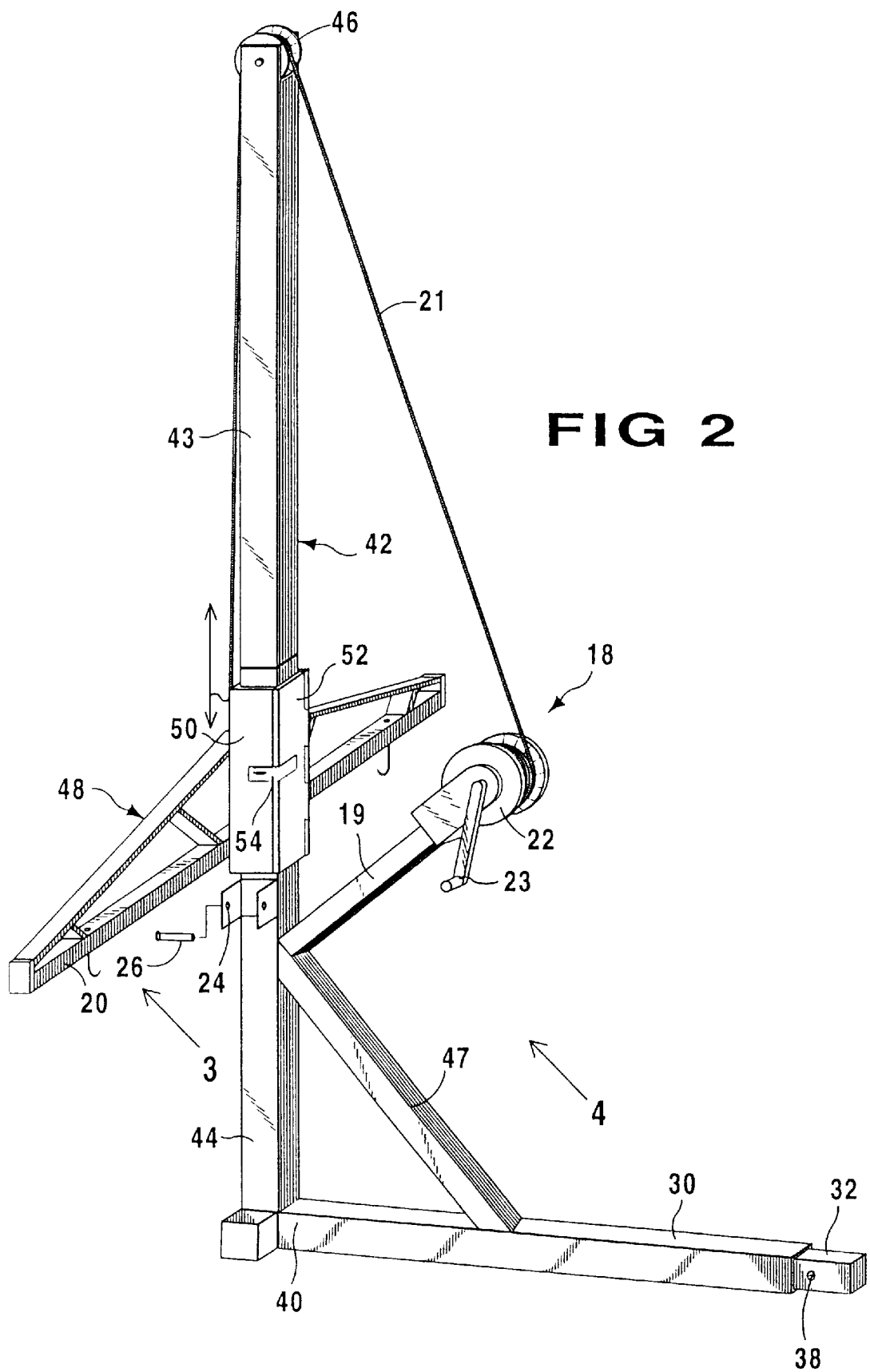

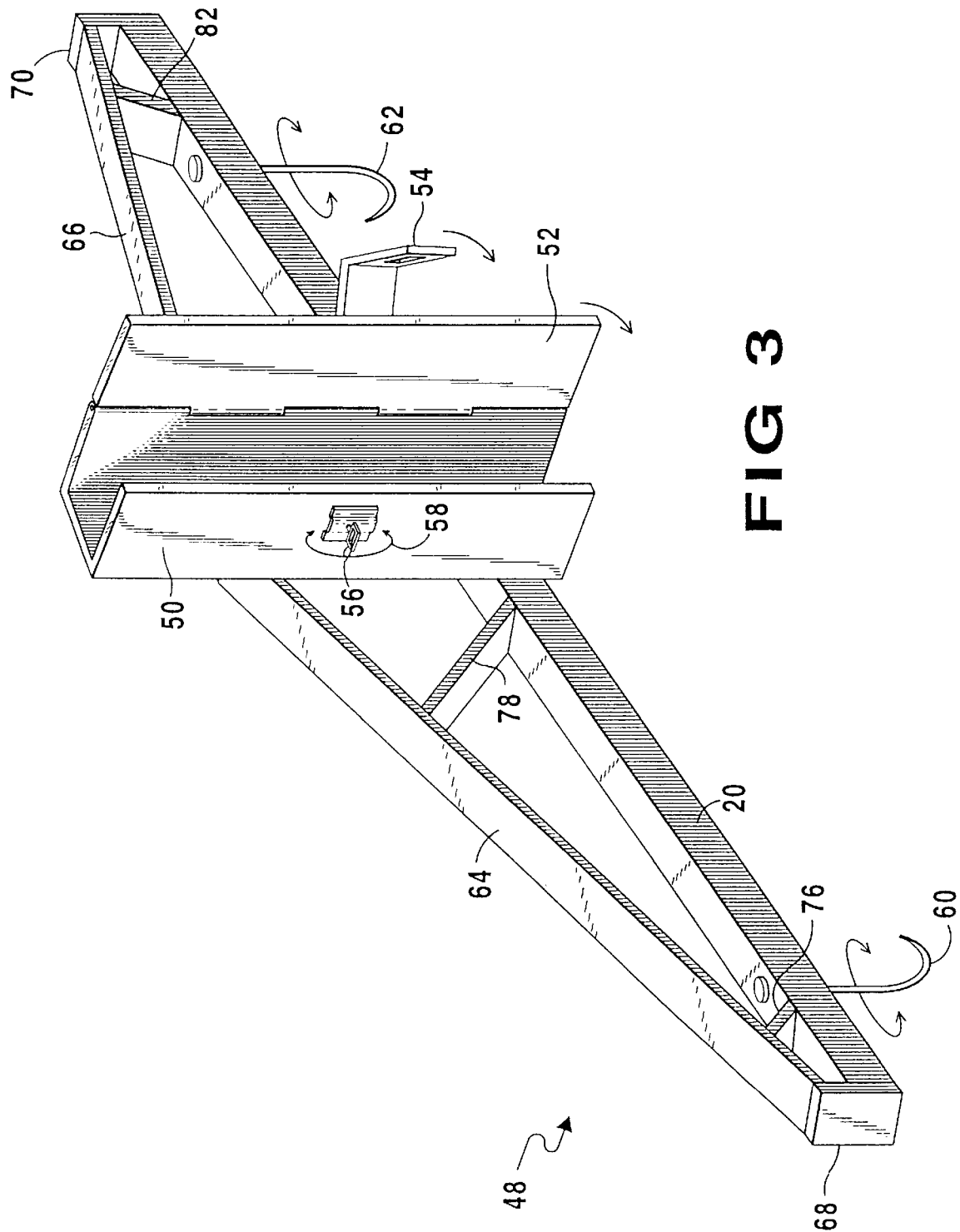

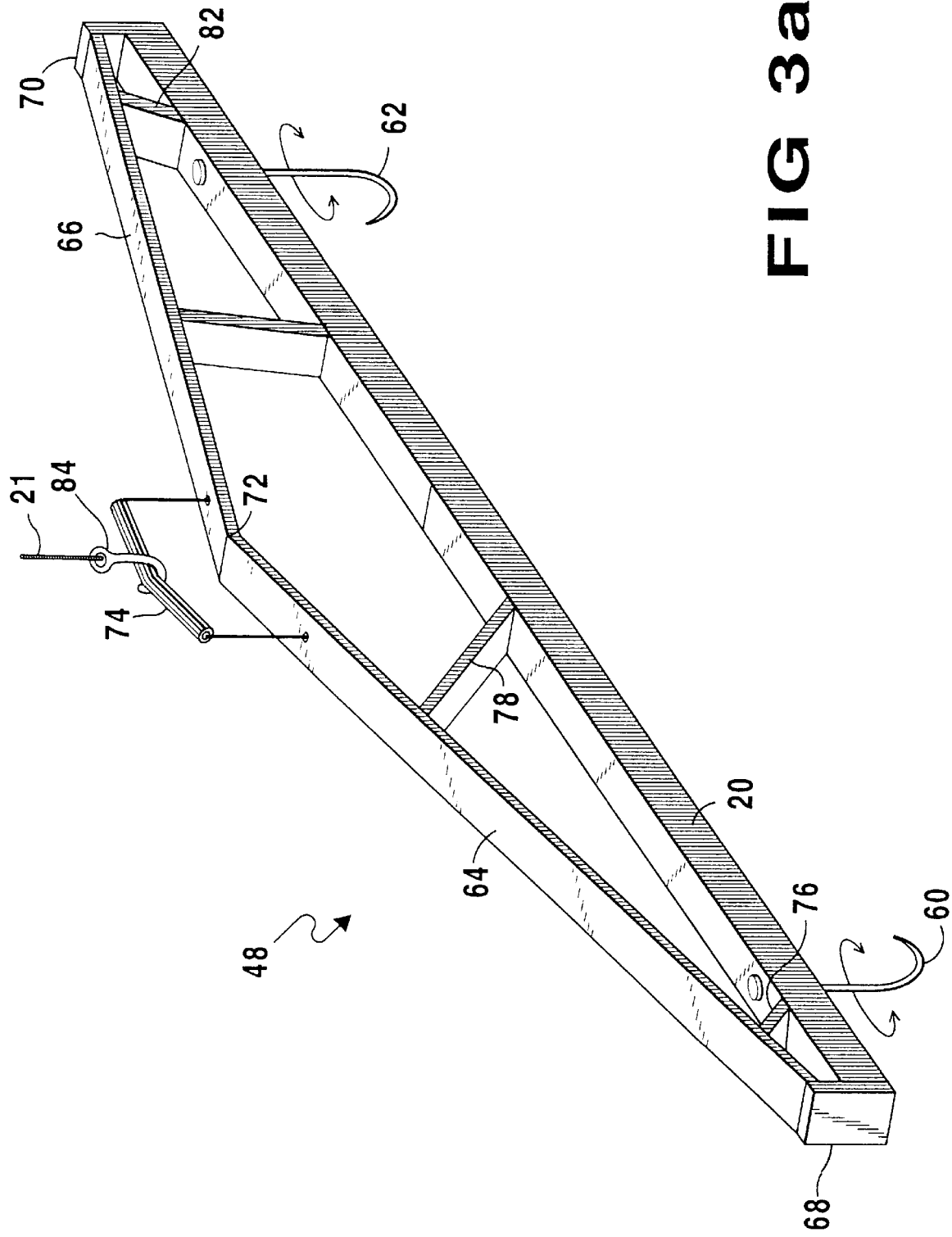

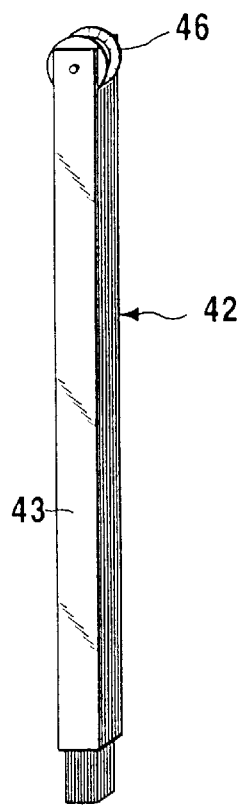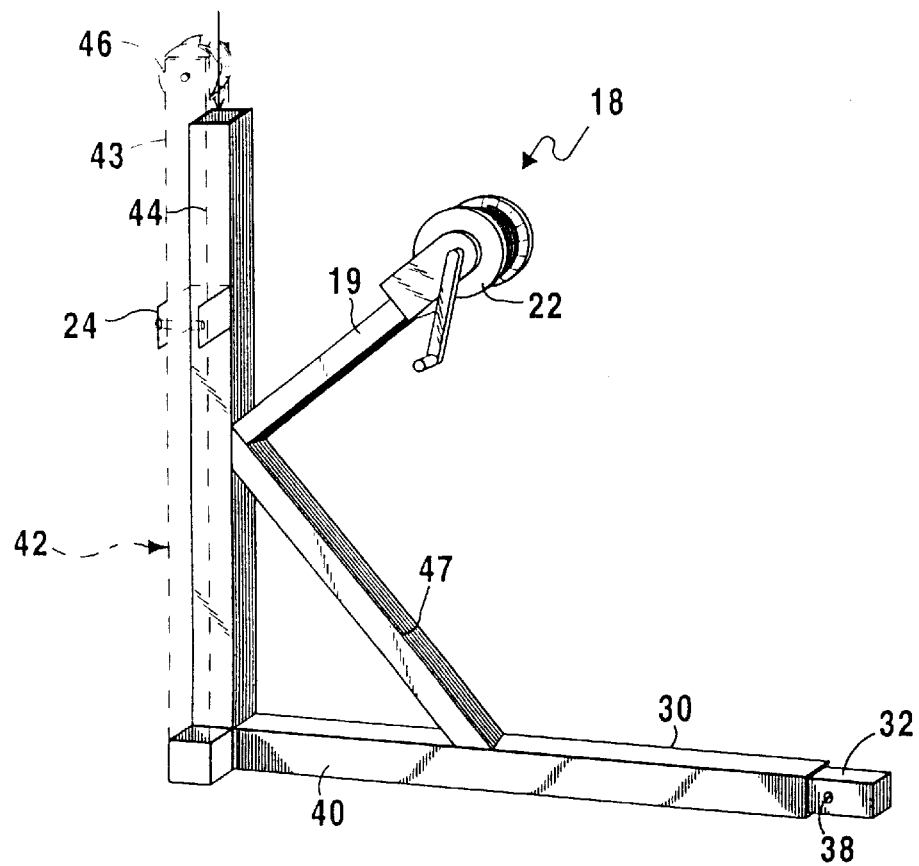
FIG 4

GAME HOIST AND CARRIER APPARATUS

BACKGROUND OF THE INVENTION

1. Field of the Invention

The present invention relates generally to game hoists and carriers and, more specifically, to a detachable hoist having a winch and a cross member, which can be detached, fed out by a cable and attached to the game.

2. Description of the Prior Art

There are numerous hoists and carriers designed to provide for the sporting industry. Typical of these is U.S. Pat. No. 5,328,192 issued to Thompson on Jul. 12, 1994.

Another was issued to Smith on Feb. 28, 1995 as U.S. Pat. No. 5,393,194. Yet another U.S. Pat. No. 5,492,196 was issued to Michno on Feb. 20, 1996. Yet another patent was issued to Muzzi et al on Sep. 2, 1997 as U.S. Pat. No. 5,662,451.

While these hoists and carriers may be suitable for the purposes for which they were designed, they would not be as suitable for the purposes of the present invention, as hereinafter described.

A manually pull-type carrier includes a mobile carriage and a towing handle assembly slidably mounted to the carriage for changing the overall length of the carrier. The mobile carriage includes a pair of longitudinal rails rigidly interconnected and spaced laterally apart by a plurality of fore-and-aft spaced transverse bars, and a pair of wheels or skis with axle assemblies movably supporting the rails and being adjustable for changing the height of the rails above the ground. The towing handle assembly includes a pair of angle side braces and a front U-shaped handle telescopic with the angle side braces for adjusting the height of the handle to fit hunters of differing heights who tow the carriage.

A game-handling apparatus which is mounted on a four-wheel all-terrain vehicle having a winch fixed to the vehicle with a winch line wound on a winch drum in the winch, the game-handling apparatus including a first roller mounted on the front of the vehicle above the winch for guiding the winch line from the winch upwardly, a roll bar pivotally secured to the vehicle and fitted with a middle pulley for guiding the winch line rearwardly and a rear roller attached to the rear of the vehicle for guiding the winch line downwardly behind the vehicle. A sling is attached to the end of the winch line and the sling is secured around a game animal such as a deer, after which, the winch is operated to wind the winch line on the winch drum and lift the deer into field-dressing configuration or onto the all-terrain vehicle for transportation.

A new and improved portable deer cart and tree stand comprising a flooring section. The flooring section has two support brackets each having a first end and a second end. Each first end is integral with opposing sides of the front end. Each of the two support brackets has securement bolts integral with side portions thereof. Included in the device is a generally U-shaped treestand seat having two leg portions, two intermediate portions, and a seat portion. The two leg portions are pivotally secured to the sides of the flooring section. The seat portion has a securement hoop there secured. Included in the device are two support brackets each having a first end and a second end. Each first end is coupled with the two intermediate portions of the treestand seat. Each second end is optionally coupled with the securement bolts of the two support brackets of the flooring section in a tree stand configuration. A tree strap has a hook therefrom. The strap surrounds a tree with the hook coupled with the securement hoop of the tree stand. The tree strap serves to mount the tree stand to the tree.

A hoist for lifting or hanging game animals. The hoist is particularly adapted for attachment to an ATV. The hoist includes a horizontal boom attached to a vertical support shaft. The vertical support shaft is telescoping to allow the height of the boom to be varied. The hoist is attached to the ATV by a base which allows the hoist to be supported in a vertical position for lifting game, and in a horizontal position for traveling. A bracing leg is also provided to prevent the ATV from tipping when heavy weights are being lifted using the hoist.

SUMMARY OF THE PRESENT INVENTION

A primary object of the present invention is to provide a hoist and carrier that will support game while field dressing and transporting it.

Another object of the present invention is to provide a hoist and carrier, which can be used by a single individual.

Yet another object of the present invention is to provide a hoist and carrier, which has a vertical member that can be detached from the horizontal member and run out by cable to game, attached thereto and by using the winch, the game may be returned to the vehicle.

A further object of the present invention is to provide a game hoist and carrier, which can be selectably attached and detached from a vehicle by the user thereof.

A still further object of the present invention is to provide a game hoist and carrier, which does not expose the interior or the exterior of the vehicle to any portion of game while transporting the game to its final destination.

Additional objects of the present invention will appear as the description proceeds.

A hoist and carrier apparatus for securing game to a vehicle is disclosed by the present invention. The hoist and carrier apparatus includes a device for connecting the apparatus to the vehicle and a vertical member having a first end connected to the connecting device, a second end and a pulley wheel disposed on the second end of the vertical member. A game hoist carrier receives the game and is releasably connected to and slideable along a length of the vertical member. A pulley is connected to and extends from the first vertical member and a cable extends from the pulley and over the pulley wheel for connecting to the game hoist carrier. When the cable is caused to be wound on the pulley, the game hoist carrier is caused to be pulled towards the vertical member and, upon being secured to the vertically extending member, slide upward along the length of the vertically extending member thereby raising any game releasably secured thereto.

The present invention overcomes the shortcomings of the prior art by providing a game hoist and carrier which can be assembled and used by a single individual to recover, field dress and transport game.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawings in which:

FIG. 2 is an enlarged perspective view of the game hoist carrier removed from the vehicle with the winch attached to the horizontal movable member which can be raised or lowered on a vertical member as needed;

FIG. 3 is an enlarged perspective view of the front of the horizontal movable member of the game hoist carrier with the device for attachment to the vertical member shown in the open position;

FIG. 3A is an enlarged perspective view of the rear of the horizontal movable member of the game hoist carrier showing the location of the hooking device for attachment to the winch cable;

FIG. 4 is an enlarged perspective view of the two portions of the vertical member of the game hoist carrier, which is affixed to a hitch disposed on the vehicle and includes a winch disposed on the lower member that contains an amount of cable to be fed over the pulley disposed at the top of the upper member.

DESCRIPTION OF THE REFERENCED NUMERALS

Figure 1:
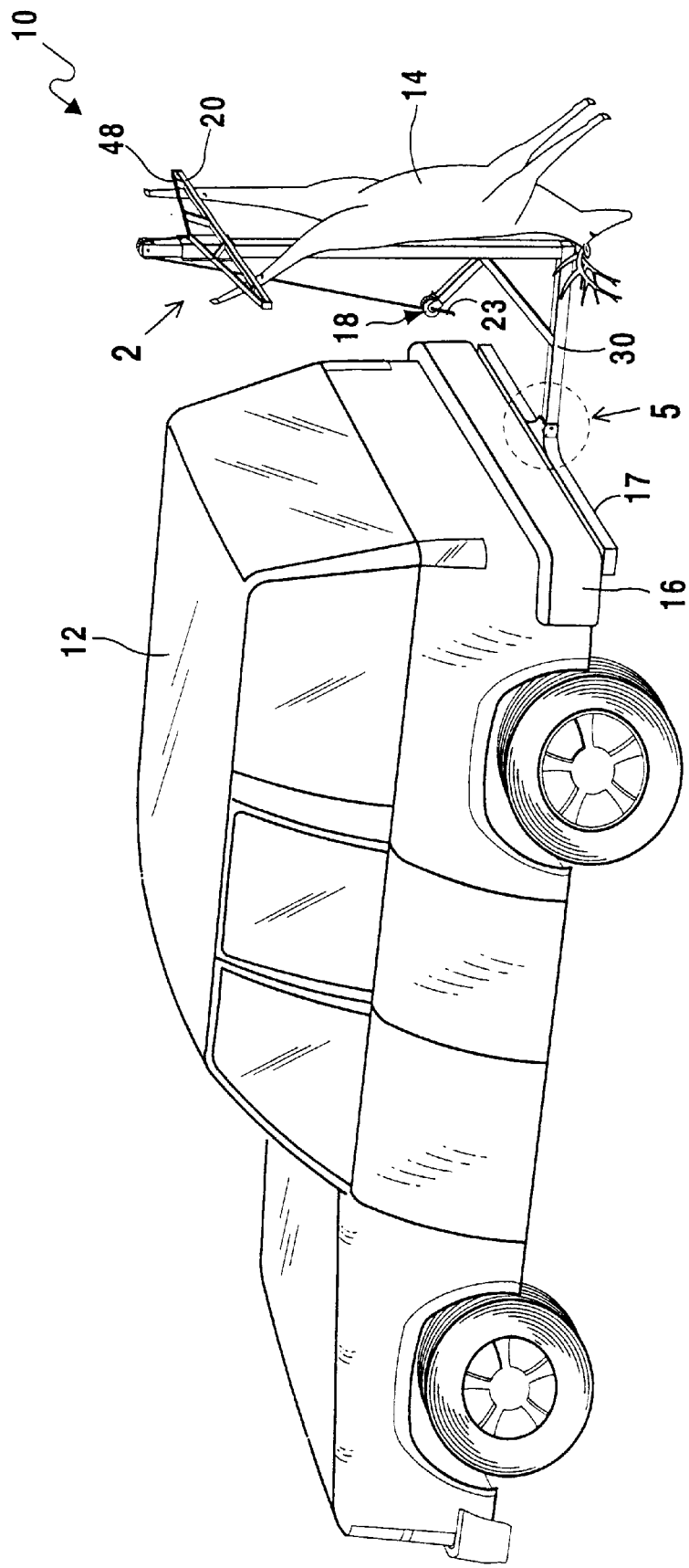
FIG. 1 is a pictorial view, in perspective, of a game hoist and carrier apparatus affixed to a sports utility vehicle, according to the principles of the present invention, with the game hoist and carrier having a deer disposed on the game hoist carrier ready for field dressing.

Turning now descriptively to the drawings, in which similar reference characters denote similar elements throughout the several views, the Figures illustrate the ladder including storage areas of the present invention. With regard to the reference numerals used, the following numbering is used throughout the various drawing figures.

10 game hoist and carrier apparatus
12 utility vehicle
14 game
16 rear bumper
17 first horizontal member
18 winch
19 third member
20 horizontal movable member
21 cable
22 pulley wheel
23 handle
24 bracket on second vertical piece
26 pin for retaining first vertical piece in bracket
30 first horizontal member
32 distal end
34 receptacle
36 retaining pin
38 aperture
40 distal end
42 vertical member
43 first vertical piece
44 second vertical piece
46 pulley wheel
47 brace member
48 game hoist carrier
50 attaching device
52 door
54 hasp
56 locking device
58 arrow
60 hook members
62 hook member
64 member
66 member
68 end
70 end
72 apex
74 hooking member
76 brace
78 brace
80 brace
82 brace
84 hook

DESCRIPTION OF THE PREFERRED EMBODIMENTS

Turning now to the drawings, in which similar reference characters denote similar elements throughout the several views, the Figures illustrate a game hoist carrier which can be installed and used by a single individual to drag the game to the vehicle, field dress the game and transport the game to another location.

Referring now to the figures, and particularly to FIG. 1, there is shown a pictorial view, in perspective, of a game hoist and carrier apparatus 10 affixed to a sports utility vehicle 12, according to the principles of the present invention, with the game hoist and carrier apparatus 10 having game in the form of a deer 14 ready for field dressing disposed thereon and affixed to the rear bumper 16 of the vehicle 12 by a first horizontally disposed member 17, in a conventional manner.

Figure 5:
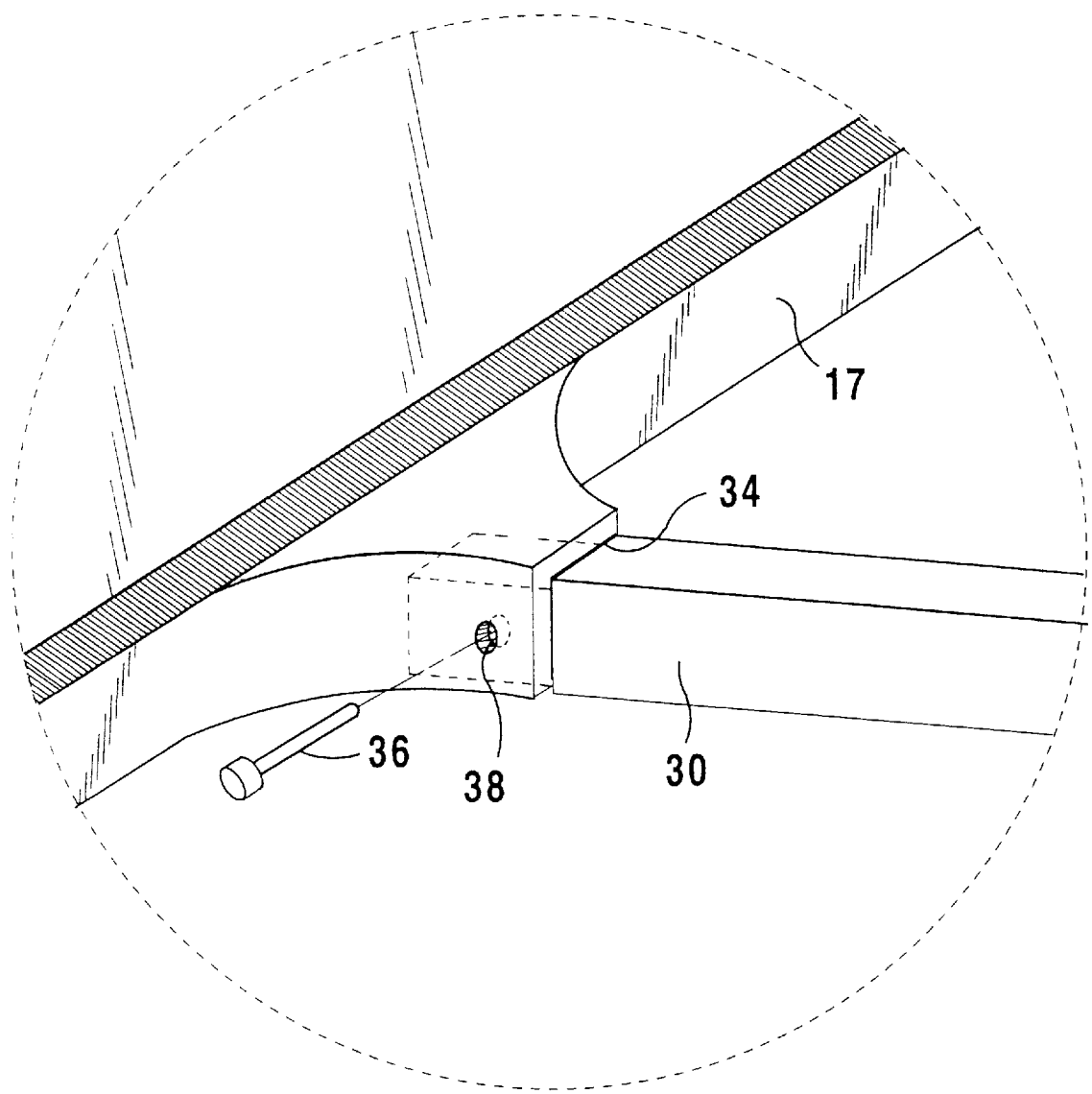
FIG. 5 is a greatly enlarged perspective view of the game hoist carrier in a position to be attached to the hitch disposed on the vehicle.

Referring now to FIG. 2, which shows an enlarged perspective view of the game hoist carrier 10 removed from the vehicle 12 with the winch 18 attached to the game hoist carrier 48 by means of a hook 84 affixed on a cable 21, which can be raised or lowered as needed (see FIG. 3A). The winch 18 is mounted on a third member 19 disposed upon one distal end at an acute angle from the second transverse horizontally disposed member 30 and includes a pulley wheel 22, having a handle 23 for ease in raising and lowering the game 14. The second transverse horizontally disposed member 30 is removably affixed to the first horizontal member 17 at one distal end 32 by insertion into a receptacle 34 provided on member 17 (see FIG. 5) and held therein by a retaining pin 36 inserted into a through aperture 38. The other distal end 40 of the second transverse horizontally disposed member 30 has affixed thereon a vertical member 42, preferably fabricated in two pieces 43 and 44 so that each piece may be less than 6 feet long. The pieces 43 and 44 fit together to form a single vertical member. The other end of vertical member 42 has a pulley wheel 46 affixed thereon (see FIG. 4). A brace member 47 is affixed between the vertical upwardly extending member 42 and the second transverse horizontally disposed member 30. The first and second vertical pieces 43 and 44 are removably connected and the second vertical piece 44 includes a bracket 24 positioned on one side thereof. When the first vertical piece 43 is removed from its connection with the second vertical piece 44, it may be received by the bracket 24 and held in place within the bracket 24 by a pin 26 extending through recesses in the bracket 24.

Referring now to FIG. 3, which shows an enlarged perspective view of the front of the horizontal movable member 20 of the game hoist carrier 48 with the attaching device 50 for attachment to the vertical member 42 shown with the locking door 52 in the open position. When attaching device 50 is placed upon the vertical member 42 and the door 52 of the attaching device 50 is closed, the hasp 54, disposed on the door 52 may be closed and the locking or retaining device 56 may be rotated as shown by arrow 58, to hold the game hoist carrier 48 to the vertical member permitting it to be moved up and down on the vertical member 42, as needed, by the winch cable 21.

The horizontal movable member 20 of the game hoist carrier 48 is seen to include two rotatable hook members 60 and 62 which are used to engage the feet of the game 14 that is to be gutted and carried away by the vehicle 12. The member 20 also includes two members 64 and 66 affixed to the horizontal movable member 20 at each end 68 and 70, joined at an apex 72 at which point a hooking member 74 is affixed to the game hoist carrier 48. The game hoist carrier 48 may also include reinforcing brace members 76, 78, 80, and 82 placed between member 20 and members 64 and 66 as shown in FIG. 3A.

In operation, the game 14 is downed and the hunter moves the vehicle 12 as close to the game 14 as is practical or the game is moved towards the vehicle. The game hoist and carrier apparatus 10 is assembled, as described earlier, and affixed to the bumper of the vehicle 12. The game hoist carrier 48 is affixed to the legs of the game 14 by means of the hook members 60 and 62 then the cable is affixed to the hooking member 74 by the hook 84 disposed on one end of cable 21. The winch 18 may then be used to shorten cable 21 and drag the game 14 towards vertical member 42 where it then may be slidably affixed thereto by closing the door 52 of attaching device 50 and closing hasp 54 and locking it utilizing locking device 56. After the game 14 is raised to the desired position the winch 18 may be locked, as explained earlier, the game 14 gutted and then carried off by the vehicle 12.

Hereinbefore, has been disclosed a game hoist and carrier apparatus 10, which is convenient, aids in moving the game carcass to the carrier, optimize the position and place for gutting the game and may be operated by any person without requiring unusual strength. It will be understood that various changes in the details, materials, arrangements of parts and operating conditions which have been herein described and illustrated in order to explain the nature of the invention may be made, by those skilled in the art, within the principles and scope of the instant invention.

Having thus set forth the nature of the invention, what is claimed is:

1. A hoist and carrier apparatus for securing game to a vehicle, said apparatus comprising:
 a) means for connecting said apparatus to the vehicle;
 b) a vertically extending member having a first end connected to said means for connecting, a second end and a pulley wheel disposed on said second end of said vertically extending member;
 c) means for receiving the game releasably connected and slideable along a length of said vertically extending member;
 d) a pulley connected to and extending from said vertically extending member; and
 e) a cable extending from said pulley and over said pulley wheel for connecting to said receiving means, wherein when said cable is caused to be wound on said pulley, said receiving means is caused to be pulled towards said vertically extending member and, upon being secured to said vertically extending member, slide upward along the length of said vertically extending member thereby raising any game releasably secured thereto;
 f) said receiving means comprising a game hoist carrier means for releasably connecting said carrier to said cable with hooks positioned on opposing ends of said carrier for releasably receiving the game, and a retaining device for sliding along said vertical member;
 g) said retaining device comprising sides surrounding said vertical member and having a locking door which when open permits said retaining device to be attached about said vertical member and when closed and secured by a hasp with a rotatable locking member which locks said retaining device onto said vertical member, said retaining device and said vertically extending member having cross sections which prevent rotation of said retaining device as it is moved up to a position allowing said vehicle to be moved carrying the game; and
 h) said vertically extending member including a first section connected to said connecting means and a second section having at least a portion thereof extending within an end of said first section opposite said connection to said connecting means, said pulley wheel being positioned on a second end of said second section, and a bracket secured to said first section for receiving said second section when removed from its position having at least a portion thereof extending within the end of said first section and a pin for securing said second section within said bracket.

2. The game hoist and carrier apparatus according to claim 1, wherein said pulley includes a wheel on which said cable is wound and a handle connected to said wheel for turning said wheel and thereby winding and unwinding said cable from said wheel.

3. The game hoist and carrier apparatus according to claim 1, further comprising a support bar extending between said connecting means and said vertically extending member for providing additional support to said vertically extending member when game is received by said receiving means and said receiving means is connected to said vertically extending member.

* * * * *